US008124153B2

(12) United States Patent
Mamiya

(10) Patent No.: US 8,124,153 B2
(45) Date of Patent: Feb. 28, 2012

(54) METHOD FOR FORMING FILM AND A FILM FORMED BY USING SAID METHOD

(75) Inventor: Minoru Mamiya, Chiba (JP)

(73) Assignee: Nichirei Foods, Inc., Tokyo (JP)

( * ) Notice: Subject to any disclaimer, the term of this patent is extended or adjusted under 35 U.S.C. 154(b) by 1219 days.

(21) Appl. No.: 10/551,743

(22) PCT Filed: Apr. 30, 2004

(86) PCT No.: PCT/JP2004/006342
§ 371 (c)(1),
(2), (4) Date: Sep. 11, 2006

(87) PCT Pub. No.: WO2005/023014
PCT Pub. Date: Mar. 17, 2005

(65) Prior Publication Data

US 2007/0098888 A1 May 3, 2007

(30) Foreign Application Priority Data

Aug. 29, 2003 (JP) ................................ 2003-307142

(51) Int. Cl.
*A23C 15/14* (2006.01)

(52) U.S. Cl. ........................................ 426/417; 426/665

(58) Field of Classification Search .................. 426/665, 426/272, 312, 314, 389, 474
See application file for complete search history.

(56) References Cited

U.S. PATENT DOCUMENTS 2,559,481 A * 7/1951 Truesdell ...................... 426/609
5,155,319 A * 10/1992 Chiu ............................ 219/634
6,099,877 A * 8/2000 Schuppan .................... 426/104

FOREIGN PATENT DOCUMENTS

JP 50-121479 A 9/1975

(Continued)

OTHER PUBLICATIONS

Babrauskas, "Temperatures in Flames and Fires," Apr. 1997, retrieved from the Internet: URL: http://www.interfire.org/features/tempertures_flames.asp.*
Abraham, A Solution to Spontaneous Combustion in Linseed Oil Formulations, 1996 (no month), Polymer Degradation and Stability, 54, pp. 157-166.*

(Continued)

*Primary Examiner* — Humera Sheikh
*Assistant Examiner* — Tynesha McClain-Coleman
(74) *Attorney, Agent, or Firm* — Duane Morris LLP; J. Rodman Steele, Jr.; Gregory M. Lefkowitz

(57) ABSTRACT

A method for forming a film on a surface of a base so that the film can impart good peeling property between the base and an object to be treated when the object contacts the base. A film formed by the method is also provided. Cooking oil 2 applied to a surface of a plate 1*a* is brought into contact with a flame, so that a film 7 imparting a peeling property relative to the plate 1*a* is formed. As the film 7 displays an excellent peeling property when a foodstuff 8 contacts the plate 1*a* with the film 7 formed therebetween, a good releasing property between the plate 1*a* and the foodstuff 8 can be obtained. As the film 7 is capable of being regenerated easily, it is possible to prevent easily and semi permanently the foodstuff 8 from firmly sticking to the plate 1*a* even though the foodstuff repeatedly contacts and releases from the plate 1*a*.

11 Claims, 3 Drawing Sheets

Step 1
2
3
1b
1c
Step 2
4
2
1b
1c
Step 3
7
6
1b
1c
Step 4
1b
1c
Step 5
1b
1c
8b

FOREIGN PATENT DOCUMENTS

| | | | |
|---|---|---|---|
| JP | 58-222036 | | 12/1983 |
| JP | 61-132170 | | 6/1986 |
| JP | 64-037249 | | 2/1989 |
| JP | 02-053433 | | 2/1990 |
| JP | 6-327393 | A | 11/1994 |

OTHER PUBLICATIONS

Buist et al., In Situ Burning, 1999 (no month), Pure Appl. Chem, vol. 71, No. 1, pp. 43-65.*

* cited by examiner

Step 1
2
3
1b
1c
Step 2
4
2
1b
1c
Step 3
7
6
1b
1c
Step 4
1b
1c
Step 5
1b
1c
8b

METHOD FOR FORMING FILM AND A FILM FORMED BY USING SAID METHOD

FIELD OF THE INVENTION

The present invention relates to a method for forming a film on a surface of a base, and a film formed by such method.

RELATED PRIOR ARTS

Conventionally, a variety of methods have been proposed in order to prevent the sticking of an object to be treated to a base due to the former contacting the latter.

For example, various types of mold releasing agents or oil to facilitate the release of a molded food (i.e., an object to be treated) from a mold (base) have been developed and proposed, for example in Japanese Examined Patent Publication No. 62-1926 and Un-Examined Patent Publication No. 64-37249.

Release agents for facilitating the easy release of frozen foods from a receptacle (base) also have been disclosed for example in Japanese Un-Examined Patent Publication No. 2-53433.

For methods for preventing foodstuffs from burning onto a roasting or baking plate (a base) when cooking, oil applying methods for applying oil to a surface of the roasting or baking plate, or Teflon (registered trademark) coating methods for coating a surface of the baking plate with Teflon (polytetrafluoroethylene) have been known.

However, in the case that a mold releasing agent is applied to a mold by spray system in the above conventional techniques, there have been problems that the viscosity of the mold releasing agent must be adjusted and maintained to apply the agent uniformly, and that the spray system is liable to be clogged. Further, when an excessive amount of the mold releasing agent is applied, then a surface of an object to be treated gets sticky, resulting in a bad quality thereof, and thus it is necessary to remove sticky matters from the surface by cleaning or the like. Furthermore, as mold releasing agents have respective different properties, all-purpose mold releasing agents have not been available. In addition, various ingredients need to be mixed in order to fulfill the respective properties of the mold releasing agents, thus resulting in increased costs.

According to the Teflon coating method for coating a surface of roasting or baking plate with Teflon, periodical recoating is necessary and the costs needed therefor would be too high.

As is discussed above, a film forming method suitable for sequential mass production, enabling an object to be treated to be released from a base easily, has been wanted for a long time.

Thus, the present invention has been made in view of the above problems, and therefore, it is an object of the present invention to provide a method for forming a film on a base, which ensures a good peeling property between the base and an object to be treated when they are contacting each other, said film being easily regenerated per every one cycle consisting of contacting and peeling between the base and the object to be treated.

It is also an object of the invention to provide a film formed by such method.

DISCLOSURE OF THE INVENTION

In order to solve the above problems, the film forming method and the film formed by such method of the present invention employ the following means:

The film forming method of the present invention features the forming of a film on a base so that the film has a peeling property against the base by allowing oil applied onto a surface of the base to contact a flame. The film of the present invention is formed by using this method.

By allowing the oil applied to the surface of the base to contact a flame, a film which has a peeling property relative to the base is formed on the surface of the base. Accordingly, when an object to be treated contacts the base with the film formed therebetween, a good releasing property between the base and the object to be treated can be obtained, due to the film imparting peeling property. Further, as the film is formed by allowing the oil applied to the surface of the base to contact a flame, it can be easily regenerated per each one cycle consisting of contacting and releasing between the base and the object. Accordingly, even when the base and the object to be treated repeatedly contact and release from each other, the object to be treated can be easily and semi permanently prevented from sticking to the base.

Also, the above-mentioned oil may be cooking oil. Thus, the film of the invention is able to be used for use in food.

The above-mentioned cooking oil may be oils and fats that contain unsaturated fatty acid. Preferably, the unsaturated fatty acid may be linoleic acid or linolenic acid. By employing the oils and fats containing unsaturated fatty acid, it is possible to form the film easily.

Still also, the film of the invention is formed in a gelatinized state. Thus, a good peeling property relative to the base can be obtained.

DESCRIPTION OF PREFERRED EMBODIMENTS

Hereinafter are described preferred embodiments of the present invention with reference to the attached drawings.

First Embodiment

Figure 1:
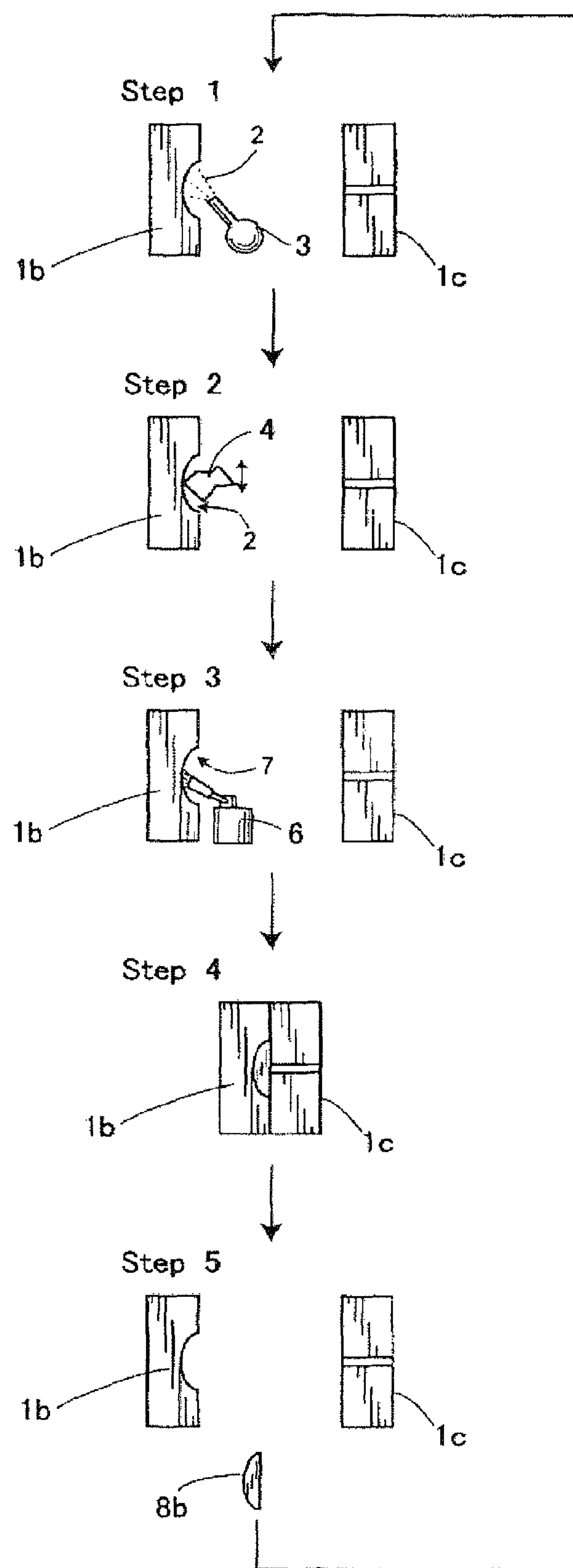
FIG. 1 is an explanatory diagram showing respective steps of a method for forming a film in accordance with a first embodiment of the invention.

FIG. 1 is an explanatory drawing showing steps of a film forming method in accordance with a first embodiment of the invention.

In Step 1, cooking oil 2 is applied to inside surfaces of molds 1*b* and 1*c* serving as a base. The cooking oil 2 is applied to the surfaces of the molds 1*b* ad 1*c* by an applicator 3. The material of the molds 1*b* and 1*c* may be stainless steel or the like. The cooking oil 2 is oils and fats that contain unsaturated fatty acid. More specifically, the cooking oil 2 may be either animal fat and oil or vegetable oil and fat. For vegetable oil and fat may be used soybean refined oil, rape seed oil, corn oil, sesame oil, olive oil, palm oil, coconut oil or the like. Alternatively, the cooking oil 2 may be beef tallow oil or lard contained in foodstuff. From a standpoint of easiness to form the film, the cooking oil 2 may more preferably be oils and fats that contain a large content of linoleic acid or linolenic acid. The temperature of the molds 1*b* and 1*c* may be 40 degrees centigrade or above, while it should desirably be 240 degrees or below, since the cooking oil will stick to the molds 1*b* and 1*c* if the temperature exceeds 240 degrees centigrade.

In Step 2, the cooking oil 2 applied in Step 1 is wiped away, using a cloth, brush, rag 4 or the like. In this Step 2, a thin and uniform layer of the cooking oil 2 is applied to the inside surfaces of the molds 1*b* and 1*c*. In the meantime, the cloth, brush, rag 4 or the like may desirably contain moisture content, because the cooking oil 2 can be spread more easily on the inside surfaces of the molds 1*b* and 1*c* by such wet cloth, brush or rag.

In Step 3, the surface of the cooking oil 2 that was thinly and evenly applied to the inside surfaces of the molds 1*b* and 1*c* is brought into contact with a flame of a burner 6 so as to roast the surface of the cooking oil 2, thus forming a film 7 on the inside surfaces of the molds 1*b* and 1*c* so that the film 7 may impart peeling property relative to the molds 1*b* and 1*c*. The film 7 is formed in a gelatinized state. The temperature of the flame of the burner 6 is desirably 1,000 degrees centigrade or above, and time of the contact by the flame of the burner 6 may be only momentary, if outer flame is at 1,500 degrees centigrade or above. For combustion gas may be used butane, acetylene gas, city gas 13A or the like.

In Step 4, the molds 1*b* and 1*c* are closed to form a molded product 8*b*.

In Step 5, the molds 1*b* and 1*c* are opened, and the molded product formed in Step 4 is removed from the molds 1*b* and 1*c*.

When the Step 5 is finished, then the process returns to Step 1. In the meantime, Step 2 may be omitted.

According to the foregoing embodiment of the invention, the cooking oil 2 is applied to the inside surfaces of molds 1*b* and 1*c* In Step 1; the surface of the cooking oil 2 applied to the inside surfaces of the molds 1*b* and 1*c* is brought into contact with a flame of the burner 6 so that the gelatinous film 7 imparting a peeling property relative to the molds 1*b* and 1*c*, is formed on the inside surfaces of the molds 1*b* and 1*c* in Step 3; the molds 1*b* and 1*c* are closed to form the molded product 8*b* in Step 4; and the molded product 8*b* formed in Step 4 is removed from the molds 1*b* and 1*c*, in Step 5.

Accordingly, the molded product 8*b* is formed by the molds 1*b* and 1*c* with the film 7 formed in Step 3 therebetween, and the film 7 has a good peeling property, and thus the molded product 8*b* can be easily released from the molds 1*b* and 1*c* when removing the molded product 8*b* from the molds 1*b* and 1*c*. Further, as the film 7 is formed by allowing the surface of the cooking oil 2 applied to the inside surfaces of the molds 1*b* and 1*c* in Step 3 to contact a flame of the burner 6, the film 7 is quite easily able to be regenerated per every one cycle consisting of Steps 1 through 5. Accordingly, by the repetition of the Steps 1 through 5, the molded product 8*b* can be easily and semi permanently prevented from sticking to the molds 1*b* and 1*c*.

Although the cooking oil 2 is used in the foregoing embodiment, any substance other than the cooking oil may be used as long as it can form a film by coming into contact with a flame.

Second Embodiment

Figure 2:
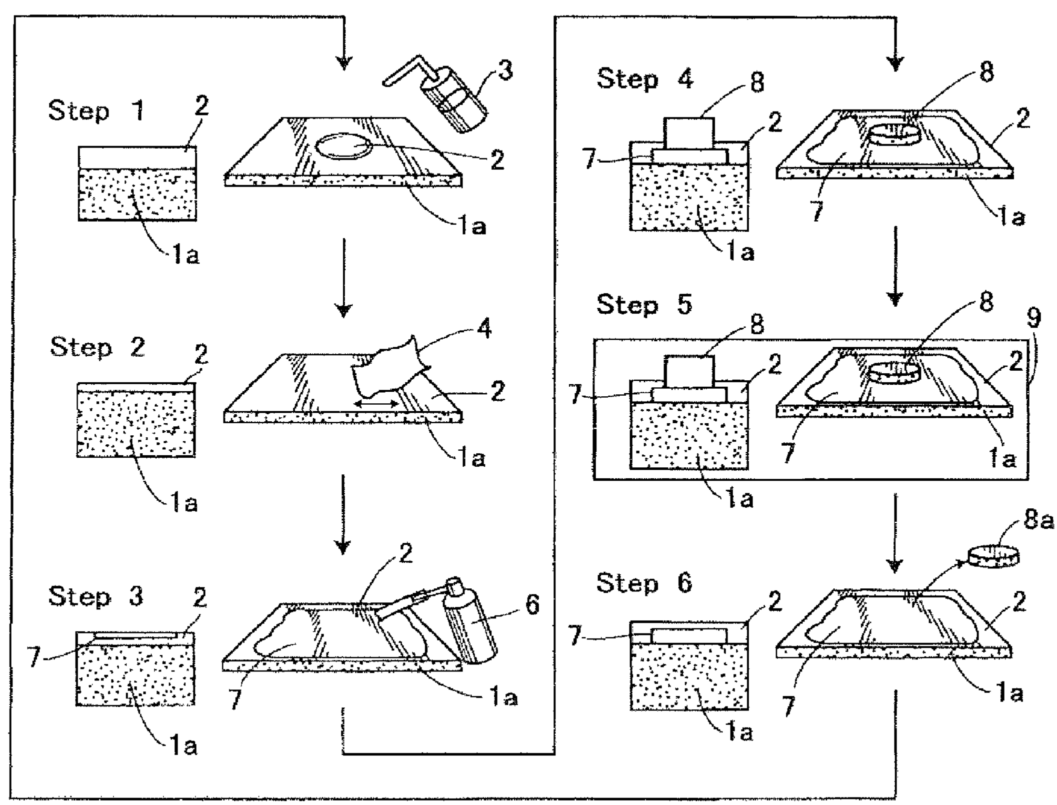
FIG. 2 is an explanatory diagram showing respective steps of a method for forming a film in accordance with a second embodiment of the invention.
Figure 3:
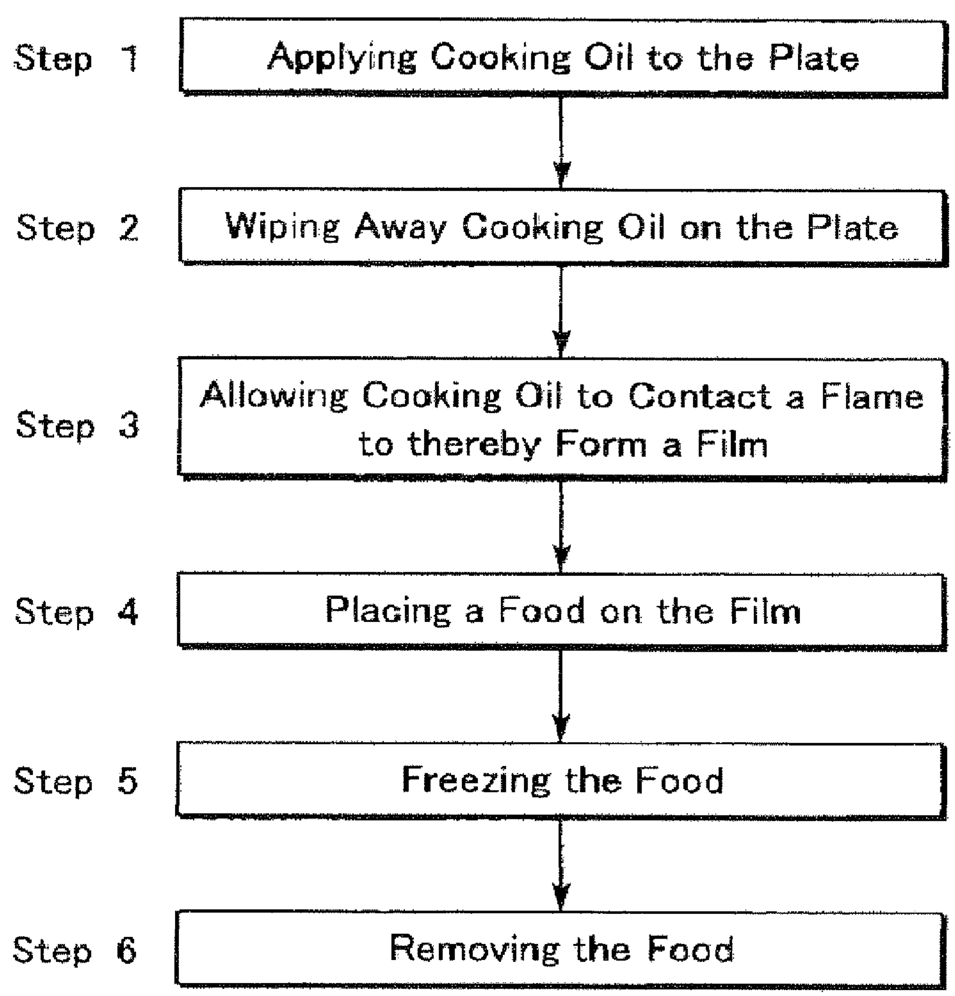
FIG. 3 is a flow chart thereof.

FIG. 2 is an explanatory drawing showing steps of a film forming method in accordance with a second embodiment of the invention.

In Step 1, cooking oil 2 is applied to a surface of a plate 1*a* serving as a base. The cooking oil 2 is applied to the surface of the plate 1*a* by the applicator 3. The plate 1*a* is made of a heat resistant material having an oil-impermeable surface. For example, the material of the plate 1*a* may be metal such as iron (SS400) and alloy (SUS430, SUS304), or nonmetal, such as porcelain and earthenware. It should be noted that if the plate 1*a* is made from an oil-shedding material, surface-active agent or the like needs to be attached to the surface of the plate 1*a* prior to applying he cooking oil 2 thereto. The cooking oil 2 used in the second embodiment may be the same as that of the first embodiment.

In Step 2, the cooking oil 2 applied in Step 1 is wiped away, using a cloth, brush, rag 4 or the like. In Step 2, a thin and uniform layer of the cooking oil 2 is applied to the surface of the plate 1*a*. In the meantime, the cloth, brush, rag 4 or the like may desirably contain moisture content, because the cooking oil 2 can be spread more easily on the surface of the plate 1*a* by such wet cloth, brush or rag.

In Step 3, the surface of the cooking oil 2 that was thinly and evenly applied to the surface of the plate 1*a* is brought into contact with a flame of the burner 6 so as to roast the surface of the cooking oil 2, thus forming the film 7 on the surface of the plate 1*a* so that the film 7 may impart peeling property relative to the plate 1*a*. The film 7 is formed in a gelatinized state. The temperature of the flame of the burner 6 is desirably 1,000 degrees centigrade or above, and time of the contact by the flame of the burner 6 may be only momentary, if outer flame is at 1,500 degrees centigrade or above. For combustion gas may be used butane, acetylene gas, city gas 13A or the like, as mentioned in the first embodiment.

In Step 4, foodstuff 8 is placed on the film 7 formed on the surface of the plate 1*a* in Step 3.

In Step 5, the foodstuff 8 placed on the film 7 formed on the surface of the plate 1*a* in Step 4 is frozen by a freezer 9.

In Step 6, the foodstuff 8 frozen in Step 5 is removed from the plate 1*a*.

When the Step 6 is finished, then the process returns to Step 1. In the meantime, Step 2 may be omitted.

According to the second embodiment of the invention, the cooking oil 2 is applied to the surface of the plate 1*a* in Step 1; the surface of the cooking oil 2 applied to the surface of the plate 1*a* is brought into contact with a flame of the burner 6 so that the gelatinous film 7 imparting a peeling property relative to the plate 1*a*, is formed on the surface of the plate 1*a* in Step 3; the foodstuff 8 is placed on the film 7 in Step 4; the foodstuff 8 is frozen in Step 5; and the frozen food product 8*a* is removed from the plate 1*a* in Step 6.

Accordingly, on the film 7 formed in step 3 is placed the foodstuff 8 in Step 4, and then it is frozen in Step 5, and therefore, the good releasing property between the surface of the plate 1*a* and the surface of the foodstuff 8 can be obtained due to the film 7 having a peeling property, when the frozen food product 8*a* is removed in Step 6. Further, as the film 7 is formed in Step 3 by allowing the surface of the cooking oil 2 to contact a flame of the burner 6, it can be easily regenerated per each one cycle consisting of the Steps 1 through 6. Accordingly, by the repetition of the Steps 1 through 6, it is possible to easily and semi permanently prevent the firm freezing between the plate 1*a* and the foodstuff 8.

Further, according to the present embodiment, the cooking oil 2 applied in Step 1 is thinly and uniformly spread on the surface of the plate 1*a*, and thus the film 7 can be formed in Step 3 in a short period of time Still also, the film 7 can be extremely easily formed by simply bringing the cooking oil into contact with a flame, and an excellent peeling property between the plate 1*a* and the foodstuff 8 can be obtained when the foodstuff 8 is placed and frozen thereon. It should be noted that when the frozen food product 8*a* with the film 7 remaining attached thereto is thawed, and then cooked, if necessary, for a customer to eat the same, the remaining film 7 does not adversely affect the texture or taste of the foodstuff 8 at all. Thus, there can be provided a film which has such a superb functionality that one does not experience any discomfort when he/she eats the film together with the foodstuff, and that the film itself has an excellent peeling property relative to the plate 1*a*.

Furthermore, as the foodstuff 8 is frozen on the film 7 having an excellent peeling property, formed on the surface of the plate 1*a*, it is possible that the foodstuff 8 does not leave any trace of peeling.

Although the foodstuff 8 placed on the film 7 is frozen by the freezer 9 in the foregoing embodiment, the foodstuff 8 may be placed on the film 7 and then heated and roasted from a rear surface of the plate 1*a* by a heating apparatus. In this case also, a good peeling property between the plate 1*a* and the foodstuff 8 can be obtained when the heated (roasted) foodstuff 8 is removed, and besides that the foodstuff 8 is prevented from burning onto the plate 1*a*, while it is able to be browned uniformly.

Alternatively, prior to forming the film 7, the plate 1*a* with the cooking oil 2 being applied thereto thinly and uniformly, may be heated from a rear surface thereof, by a heating apparatus, utilizing gas burning, induction heating (IH), steam heating or the like as a heating source. In that case, the temperature of the plate 1*a* to be heated is desirably 40 degrees centigrade or above, but 240 degrees centigrade or below, because the cooking oil 2 firmly sticks to the plate 1*a* when the temperature exceeds 240 degrees centigrade. Additionally, it should be noted that a good peeling property between the plate 1*a* and the foodstuff 8 can be obtained even in a case that the foodstuff 8 is kept as it is without being frozen or heated after it is placed on the film 7.

Although the forming of the film 7 is carried out on the plate 1*a* in the foregoing embodiment, the forming of the film 7 may be carried out by mass production, using a known apparatus such as a belt conveyer. In the case that a belt conveyer is used, a manufacturing system may be constructed such that the cooking oil 2 is applied to the belt conveyer and then wiped away; the film 7 is then formed by allowing the flame of the burner 6 to contact the surface of the cooking oil 2. Such manufacturing system may further comprise the steps of placing the foodstuff on the film 7, and then freezing or heating the foodstuff 8.

The present invention should not be limited to the foregoing embodiments, but may be variously modified within a scope of the invention. For example, the present invention should not be limited to the above-mentioned fields of food processing or molding, but it is applicable to a variety of other fields where an object to be treated needs to peel off from a base easily.

What is claimed:

1. A method for forming a gelatinous film, comprising the steps of applying cooking oil onto a surface of a base; and bringing a surface of the cooking oil applied onto the surface of the base into contact with a flame having a temperature of 1,000° C. or above, wherein said gelatinous film (i) is formed only from cooking oil, (ii) is formed by the contact of the surface of said cooking oil with flame, and (iii) has a peeling property relative to a base, and wherein a foodstuff is placed on the base with the gelatinous film in between.

2. A method for forming a film according to claim 1, wherein said cooking oil is oil and fat containing unsaturated fatty acid.

3. A method for forming a film according to claim 2, wherein said unsaturated fatty acid is linoleic acid or linolenic acid.

4. A film formed by the method for forming a film according to claim 1.

5. A film according to claim 4, wherein said cooking oil is oil and fat containing unsaturated fatty acid.

6. A film according to claim 5, wherein said unsaturated fatty acid is linoleic acid or linolenic acid.

7. A method for preventing an object to be treated from sticking to a base due to the base contacting the object, comprising the steps of: applying cooking oil onto a surface of a base; and then bringing a surface of the cooking oil applied onto the surface of the base into contact with a flame having a temperature of 1,000° C. or above, wherein said gelatinous film (i) is formed only from cooking oil, (ii) is formed by the contact of the surface of said cooking oil with flame, and (iii) has a peeling property relative to a base, and wherein a foodstuff is placed on the base with the gelatinous film in between.

8. A method for forming a film according to claim 1, wherein the cooking oil applied onto the surface of the base is spread before the step of bringing a surface of the cooking oil into contact with a flame.

9. A method for preventing an object to be treated from sticking to a base due to the base contacting the object according to claim 7, wherein the cooking oil applied onto the surface of the base is spread before the step of bringing a surface of the cooking oil into contact with a flame.

10. A method for forming a film according to claim 1, wherein the base comprises metal, porcelain, earthenware, or a combination thereof.

11. The method for preventing an object to be treated from sticking to a base due to the base contacting the object according to claim 7, wherein the object is a foodstuff and the base comprises metal, porcelain, earthenware, or a combination thereof.

* * * * *